US011265746B2

(12) United States Patent
Da Silva et al.

(10) Patent No.: US 11,265,746 B2
(45) Date of Patent: Mar. 1, 2022

(54) CONFIGURING MEASUREMENT REPORTING FOR NEW RADIO

(71) Applicant: Telefonaktiebolaget LM Ericsson (publ), Stockholm (SE)

(72) Inventors: Icaro L. J. Da Silva, Solna (SE); Pradeepa Ramachandra, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 570 days.

(21) Appl. No.: 16/301,931

(22) PCT Filed: Oct. 30, 2018

(86) PCT No.: PCT/SE2018/051109
§ 371 (c)(1),
(2) Date: Nov. 15, 2018

(87) PCT Pub. No.: WO2019/088905
PCT Pub. Date: May 9, 2019

(65) Prior Publication Data
US 2021/0195451 A1 Jun. 24, 2021

Related U.S. Application Data

(60) Provisional application No. 62/581,544, filed on Nov. 3, 2017.

(51) Int. Cl.
H04W 4/00 (2018.01)
H04W 24/10 (2009.01)
H04W 36/00 (2009.01)

(52) U.S. Cl.
CPC ....... H04W 24/10 (2013.01); H04W 36/0058 (2018.08); H04W 36/0085 (2018.08)

(58) Field of Classification Search
CPC ............ H04W 24/10; H04W 36/0085; H04W 36/0058
See application file for complete search history.

(56) References Cited

U.S. PATENT DOCUMENTS 9,572,061 B2 * 2/2017 Jung ..................... H04W 24/10
10,511,985 B2 * 12/2019 Kim ...................... H04W 24/10
(Continued)

OTHER PUBLICATIONS

3GPP TS 36.331, V14.4.0 (Sep. 2017) Technical Specification, 3rd Generation Partnership Project; Technical Specification Group Radio Access Network; Evolved Universal Terrestrial Radio Access (E-UTRA); Radio Resource Control (RRC); Protocol specification (Release 14), 753 pages, dated Sep. 26, 2017.
Ericsson, "Summary of Offline #39: configurability of NR servicing cell measurements," 3GPP TSG-RAN WG2 #99bis, Tdoc R2-1712047; Prague, Czech Republic, Oct. 9-13, 2017, 3, pages.
(Continued)

Primary Examiner — Abdelnabi O Musa
(74) Attorney, Agent, or Firm — Sage Patent Group

(57) ABSTRACT

According to certain embodiments, a wireless device performs a method for measurement configuration and reporting. The wireless device is associated with a plurality of serving cells. The method comprises obtaining a plurality of measurement configurations from a network node. Each measurement configuration comprises a measurement identifier, a measurement object, and a report configuration. The method further comprises performing measurements on each serving cell of the plurality of serving cells according to at least one measurement configuration. When a measurement report associated with a measurement identifier is triggered, the method further comprises reporting results of the performed measurements for the plurality of serving cells to a network node according to the report configuration of the measurement configuration with the measurement identifier associated with the triggered event.

24 Claims, 12 Drawing Sheets

(56) References Cited

U.S. PATENT DOCUMENTS

| | | | |
|---|---|---|---|
| 2010/0111039 A1* | 5/2010 | Kim | H04W 76/28 370/331 |
| 2012/0294184 A1* | 11/2012 | Jung | H04W 36/0085 370/252 |
| 2014/0087715 A1* | 3/2014 | Suzuki | H04W 24/10 455/422.1 |
| 2015/0139005 A1* | 5/2015 | Tsuboi | H04L 5/0053 370/252 |
| 2015/0195731 A1* | 7/2015 | Jung | H04L 5/0048 370/252 |
| 2017/0208494 A1* | 7/2017 | Moon | H04L 5/0048 |
| 2018/0184320 A1* | 6/2018 | Shi | H04W 36/00 |
| 2020/0077288 A1* | 3/2020 | Tsuboi | H04W 76/16 |

OTHER PUBLICATIONS

Ericsson, "Remaining open issues on measurement reporting in NR," 3GPP TSG-RAN WG2 #Ad Hoc, Tdoc R2-1707286, Qingdao, China, Jun. 27-29, 2017, 8 pages.

Ericsson, "Remaining issues of email discussion # 20 on measurement reporting," 3GPP TSG-RAN WG2 Meeting #100 on NR, R2-1713598, Reno, Nevada, Nov. 27-Dec. 1, 2017, 13 pages.

Patent Cooperation Treaty, Written Opinion of the International Searching Authority (PCT Rule 43bis. 1), PCT/SE2018/051109, dated Dec. 13, 2018, 10 pages.

Patent Cooperation Treaty, International Search Report, PCT/SE2018/051109, dated December 13, 2018, 4 pages.

\* cited by examiner

CONFIGURING MEASUREMENT REPORTING FOR NEW RADIO

PRIORITY

This nonprovisional application is a U.S. National Stage Filing under 35 U.S.C § 371 of International Patent Application Serial No. PCT/SE2018/051109 filed Oct. 30, 2018, and entitled "CONFIGURING MEASUREMENT REPORTING FOR NEW RADIO" which claims priority to U.S. Provisional Patent Application No, 62/581,544 filed Nov. 3, 2017, both of which are hereby incorporated by reference in their entirety.

TECHNICAL FIELD

Embodiments of the present disclosure are directed to wireless communications and, more particularly, to configuring measurement reporting for Third Generation Partnership Project (3GPP) fifth generation (5G) new radio (NR).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third Generation Partnership Project (3GPP) long term evolution (LTE) includes primary cell (PCell) and secondary cell (SCell) related configurations for measuring particular signals and/or frequencies. The network provides a measurement configuration to a user equipment (UE). The measurement configuration includes information that the UE uses for performing measurements. An example measurement configuration includes the MeasConfig information element (reproduced below) in 3GPP TS 36.331, which provides the UE with, among other things, the measurement objects, reporting configuration, and quantity configuration. A measurement configuration may include one or measurement identifiers (e.g., measId) associated with one or more report configurations (e.g., reportConfig) and one or more measurement objects (e.g., measObject).

```
-- ASN1START
MeasConfig ::=                                      SEQUENCE {
    -- Measurement objects
    measObjectToRemoveList                          MeasObjectToRemoveList
            OPTIONAL,          -- Need ON
    measObjectToAddModList                          MeasObjectToAddModList
            OPTIONAL,          -- Need ON
    -- Reporting configurations
    reportConfigToRemoveList                        ReportConfigToRemoveList
    OPTIONAL,       -- Need ON
    reportConfigToAddModList                        ReportConfigToAddModList
    OPTIONAL,       -- Need ON
    -- Measurement identities
    measIdToRemoveList                                        MeasIdToRemoveList
                                    OPTIONAL,       -- Need ON
    measIdToAddModList                                        MeasIdToAddModList
                                    OPTIONAL,       -- Need ON
    -- Other parameters
    quantityConfig                                            QuantityConfig
                                    OPTIONAL,       -- Need ON
    measGapConfig                                             MeasGapConfig
                                    OPTIONAL,       -- Need ON
    s-Measure                                                 RSRP-Range
                                    OPTIONAL,       -- Need ON
    preRegistrationInfoHRPD                                   PreRegistrationInfoHRPD
            OPTIONAL,          -- Need OP
    speedStatePars                              CHOICE {
            release                                           NULL,
            setup                                             SEQUENCE{
                    mobilityStateParameters
    MobilityStateParameters,
                    timeToTrigger-SF
    SpeedStateScaleFactors
                    }
            }
                                                    OPTIONAL,  -- Need ON
    ...,
    [[       measObjectToAddModList-v9e0
    MeasObjectToAddModList-v9e0                     OPTIONAL  -- Need ON
    ]],
    [[          allowInterruptions-r11                        BOOLEAN
                                        OPTIONAL    --Need ON
    ]],
```

```
    [[          measScaleFactor-r12                CHOICE {
                   release                                NULL,
                   setup                                  MeasScaleFactor-r12
                }
                                            OPTIONAL,    -- Need ON
                measIdToRemoveListExt-r12
    MeasIdToRemoveListExt-r12                   OPTIONAL, --Need ON
                measIdToAddModListExt-r12
    MeasIdToAddModListExt-r12                   OPTIONAL, --Need ON
                measRSRQ-OnAllSymbols-r12              BOOLEAN
                         OPTIONAL         --Need ON
    ]],
    [[
                measObjectToRemoveListExt-r13          MeasObjectToRemoveListExt-
    r13  OPTIONAL,         --Need ON
                measObjectToAddModListExt-r13          MeasObjectToAddModListExt-
    r13  OPTIONAL,         --Need ON
                measIdToAddModList-v1310                      MeasIdToAddModList-
    v1310       OPTIONAL, -- Need ON
                measIdToAddModListExt-v1310
       MeasIdToAddModListExt-v1310             OPTIONAL  -- Need ON
       ]]
    }
    MeasIdToRemoveList ::=                  SEQUENCE (SIZE (1..maxMeasId))
    OF MeasId
    MeasIdToRemoveListExt-r12 ::=           SEQUENCE (SIZE (1..maxMeasId)) OF
    MeasId-v1250
    MeasObjectToRemoveList ::=              SEQUENCE (SIZE (1..maxObjectId))
    OF MeasObjectId
    MeasObjectToRemoveListExt-r13 ::=       SEQUENCE (SIZE (1..maxObjectId)) OF
    MeasObjectId-v1310
    ReportConfigToRemoveList ::=            SEQUENCE (SIZE (1..maxReportConfigId))
    OF ReportConfigId
    -- ASN1STOP
```

A UE may be configured with multiple measurement objects corresponding to a carrier associated with the measurement object. In carrier aggregation (CA) or dual connectivity (DC), the UE is configured with one PCell and possibly one or more SCells. The UE performs the measurements in the corresponding frequencies.

In LTE, only one reference signal (RS) type is used to derive cell quality or cell measurement results. Thus, upon receiving a measurement configuration, the UE performs cell measurement results for the PCell and the configured SCells based on the cell-specific reference signal in the configured frequencies. Therefore, for all the serving cells, the UE uses the same reference signal type (i.e., the cell-specific RS).

Fifth generation (5G) new radio (NR) also includes 3GPP requirements related to PCell and SCells. For example, event triggered reporting includes PCell and SCells cell quality in the measurement report. Thus, a UE always includes PCell and SCells measurements in the measurement report. Beam level information (beam IDs and/or available measurements results) of PCell/PSCell and SCell is included in the measurement report if the network has configured the UE to do so. The UE performs reference signal received power (RSRP) and reference signal received quality (RSRQ) measurements for each serving cell. Signal to interference and noise ratio (SINR) may always be measured on serving cells or may be configured by the network. One RS type for serving cell measurement reporting and neighbor cell measurement reporting is configured in one reporting configuration.

Some requirements include configurability of NR serving cell measurements. For example, if a measurement report is triggered associated to any measurement ID, then the UE includes all available measurement results for PCell and configured SCells.

A UE always performs RSRP and RSRQ measurements for all the serving cells. The reporting configuration provides the RS type to be used for the measurement reporting of the serving cells. The network can also request the UE to include the beam level information for the serving cells. The network can configure a UE to report the best neighbor cells in the serving frequencies.

SUMMARY

Based on the specifications above, a user equipment (UE) always includes PCell and SCells measurements in a measurement report. The UE always performs reference signal receive power (RSRP) and reference signal receive quality (RSRQ) measurements for all the serving cells. The reporting configuration provides the reference signal (RS) type to be used for the measurement reporting of the serving cells. The network can also request the UE to include the beam level information for the serving cells. The requirements, however, do not solve all the problems related to measurement reporting, such as: (a) whether to include all quantities (RSRP, RSRQ and signal to interference plus noise ratio (SINR)) based reporting for serving cells, and if so, where to find the corresponding configuration; (b) where to configure whether to include the beam level information of the serving cell; (c) how many beams to be included for the serving cell measurements; (d) how to select serving cells' beams to be included in the measurement report; and (e) what type of measurements (RS type, cell and/or beam, RSRP and/or RSRQ and/or SINR) to include for the neighboring cells in the serving frequencies.

Certain aspects of the present disclosure and their embodiments may provide solutions to these or other challenges. Particular embodiments include methods for a UE to determine which beams are to be reported for the serving cell. Particular embodiments include methods for the UE to determine which cell level measurements are to be reported for the serving cell. Particular embodiments include methods for the UE to determine which neighbor cell level and neighbor cell beam level measurements are to be reported for the serving frequencies.

According to certain embodiments, a wireless device performs a method for measurement configuration and reporting. The wireless device is associated with a plurality of serving cells. The method comprises obtaining a plurality of measurement configurations from a network node. Each measurement configuration comprises a measurement identifier, a measurement object, and a report configuration. The method further comprises performing measurements on each serving cell of the plurality of serving cells according to at least one measurement configuration. When a measurement report associated with a measurement identifier is triggered, the method further comprises reporting results of the performed measurements for the plurality of serving cells to a network node according to the report configuration of the measurement configuration with the measurement identifier associated with the triggered event.

In particular embodiments, each measurement configuration of the plurality of measurement configurations includes an indication of whether beam level measurement is enabled, and reporting results of the performed measurements for the plurality of serving cells comprises reporting beam level measurements according to the report configuration of the measurement configuration with the measurement identifier associated with the triggered event.

In particular embodiments, each measurement configuration of the plurality of measurement configurations includes a number of beams to report, and reporting results of the performed measurements for the plurality of serving cells comprises reporting measurements for the number of beams according to the report configuration of the measurement configuration with the measurement identifier associated with the triggered event.

In particular embodiments, each measurement configuration of the plurality of measurement configurations includes a beam signal threshold, and reporting results of the performed measurements for the plurality of serving cells comprising reporting measurements for the beams with beam signal qualities better than the beam signal threshold of the measurement object of the measurement configuration with the measurement identifier associated with the triggered event.

In particular embodiments, each measurement configuration of the plurality of measurement configurations includes a beam signal threshold, and reporting results of the performed measurements for the plurality of serving cells comprising reporting measurements for the beams with beam signal qualities better than the beam signal threshold of a measurement object associated with the serving cell.

In particular embodiments, wherein each measurement configuration of the plurality of measurement configurations includes a reference signal type, and reporting results of the performed measurements for the plurality of serving cells comprising reporting measurements based on the reference signal type of the report configuration of the measurement configuration with the measurement identifier associated with the triggered event, wherein the reference signal type comprises at least one of a CSI-RS or a SS.

In particular embodiments, the method further comprises reporting results of measurements on a neighbor cell to a network node according to a measurement configuration associated with a serving cell that uses the same frequency as the neighbor cell. The neighbor cell may be one of a plurality of neighbor cells, and based on the performed measurements, the neighbor cell signal quality may be better than the other neighbor cells of the plurality of neighbor cells.

According to some embodiments, a wireless device is associated with a plurality of serving cells. The wireless device comprises processing circuitry operable to obtain a plurality of measurement configurations from a network node. Each measurement configuration of the plurality of measurement configurations comprises a measurement identifier, a measurement object, and a report configuration. The processing circuitry is further operable to perform measurements on each serving cell of the plurality of serving cells according to at least one measurement configuration of the plurality of measurement configurations. When a measurement report associated with a measurement identifier is triggered, the processing circuitry is operable to report results of the performed measurements for the plurality of serving cells to a network node according to the report configuration of the measurement configuration with the measurement identifier associated with the triggered event.

In particular embodiments, each measurement configuration of the plurality of measurement configurations includes an indication of whether beam level measurement is enabled, and the processing circuitry is operable to report the results of the performed measurements for the plurality of serving cells by reporting beam level measurements according to the report configuration of the measurement configuration with the measurement identifier associated with the triggered event.

In particular embodiments, each measurement configuration of the plurality of measurement configurations includes a number of beams to report, and the processing circuitry is operable to report the results of the performed measurements for the plurality of serving cells by reporting measurements for the number of beams according to the report configuration of the measurement configuration with the measurement identifier associated with the triggered event.

In particular embodiments, each measurement configuration of the plurality of measurement configurations includes a beam signal threshold, and the processing circuitry is operable to report the results of the performed measurements for the plurality of serving cells by reporting measurements for the beams with beam signal qualities better than the beam signal threshold of the measurement object of the measurement configuration with the measurement identifier associated with the triggered event.

In particular embodiments, each measurement configuration of the plurality of measurement configurations includes a beam signal threshold, and the processing circuitry is operable to report the results of the performed measurements for the plurality of serving cells by reporting measurements for the beams with beam signal qualities better than the beam signal threshold of a measurement object associated with the serving cell.

In particular embodiments, each measurement configuration of the plurality of measurement configurations includes a reference signal type, the processing circuitry is operable to report the results of the performed measurements for the plurality of serving cells comprising reporting measurements based on the reference signal type of the report configuration of the measurement configuration with the measurement identifier associated with the triggered event, wherein the reference signal type comprises at least one of a CSI-RS or a SS.

In particular embodiments, the processing circuitry is further operable to report results of measurements on a neighbor cell to a network node according to a measurement configuration associated with a serving cell that uses the same frequency as the neighbor cell. The neighbor cell may be one of a plurality of neighbor cells, and based on the performed measurements, the neighbor cell signal quality may be better than the other neighbor cells of the plurality of neighbor cells.

According to some embodiments, a method for measurement configuration performed by a network node comprises transmitting a plurality of measurement configurations to a wireless device for configuring measurements on a plurality of serving cells. Each measurement configuration of the plurality of measurement configurations comprises a measurement identifier, a measurement object, and a report configuration. The method further comprises receiving, from the wireless device, a measurement report that includes results of measurements performed by the wireless device on each serving cell of the plurality of serving cells according to a report configuration of a measurement configuration with a measurement identifier associated with the event that triggered the measurement report.

According to some embodiments, a network node comprises processing circuitry operable to transmit a plurality of measurement configurations to a wireless device for configuring measurements on a plurality of serving cells. Each measurement configuration of the plurality of measurement configurations comprises a measurement identifier, a measurement object, and a report configuration. The processing circuitry is further operable to receive, from the wireless device, a measurement report that includes results of measurements performed by the wireless device on each serving cell of the plurality of serving cells according to a report configuration of a measurement configuration with a measurement identifier associated with the event that triggered the measurement report.

In particular embodiments, each measurement configuration of the plurality of measurement configurations includes a number of beams to report, and the measurement report includes results of measurements performed by the wireless device on each serving cell according to the report configuration of the measurement configuration with the measurement identifier associated with the event that triggered the measurement report.

In particular embodiments, each measurement configuration of the plurality of measurement configurations includes a beam signal threshold, and the measurement report includes results of measurements performed by the wireless device on each serving cell for the beams with beam signal qualities better than the beam signal threshold of the measurement object of the measurement configuration with the measurement identifier associated with the event that triggered the measurement report.

In particular embodiments, each measurement configuration of the plurality of measurement configurations includes a beam signal threshold, and the measurement report includes results of measurements performed by the wireless device on each serving cell for the beams with beam signal qualities better than the beam signal threshold of a measurement object associated with the serving cell.

In particular embodiments, each measurement configuration of the plurality of measurement configurations includes a reference signal type, and the measurement report includes results of measurements performed by the wireless device on each serving cell based on the reference signal type of the report configuration of the measurement configuration with the measurement identifier associated with the event that triggered the measurement report, wherein the reference signal type comprises at least one of a CSI-RS or a SS.

In particular embodiments, the measurement report further includes results of measurements on a neighbor cell according to a measurement configuration associated with a serving cell that uses the same frequency as the neighbor cell. The neighbor cell may be one of a plurality of neighbor cells, and based on the performed measurements, the neighbor cell signal quality may be better than the other neighbor cells of the plurality of neighbor cells.

Also disclosed is a computer program product comprises a non-transitory computer readable medium storing computer readable program code, the computer readable program code is operable, when executed by processing circuitry, to perform any of the wireless device methods described above.

Another computer program product comprises a non-transitory computer readable medium storing computer readable program code, the computer readable program code is operable, when executed by processing circuitry, to perform any of the network node methods described above.

According to some embodiments, a wireless device is associated with a plurality of serving cells. The wireless device comprises an obtaining unit, a measuring unit and a transmitting unit. The obtaining unit is operable to obtain a plurality of measurement configurations from a network node. Each measurement configuration of the plurality of measurement configurations comprising a measurement identifier, a measurement object, and a report configuration. The measuring unit is operable to perform measurements on each serving cell of the plurality of serving cells according to at least one measurement configuration of the plurality of measurement configurations. The transmitting unit is operable to, when a measurement report associated with a measurement identifier is triggered, report results of the performed measurements for the plurality of serving cells to a network node according to the report configuration of the measurement configuration with the measurement identifier associated with the triggered event.

According to some embodiments, a network node comprises a configuring unit and a receiving unit. The configuring unit is operable to transmit a plurality of measurement configurations to a wireless device for configuring measurements on a plurality of serving cells. Each measurement configuration of the plurality of measurement configurations comprises a measurement identifier, a measurement object, and a report configuration. The receiving unit is operable to receive, from the wireless device, a measurement report that includes results of measurements performed by the wireless device on each serving cell of the plurality of serving cells according to a report configuration of a measurement configuration with a measurement identifier associated with the event that triggered the measurement report.

Certain embodiments may provide one or more of the following technical advantages. For example, particular embodiments provide flexibility for a network to configure a measurement configuration with a reduced measurement report size but that still includes the relevant information from a UE.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there currently exist certain challenges with measurement configuration in Third Generation Partnership Project (3GPP) fifth generation (5G) new radio (NR). For example, a user equipment (UE) always includes primary cell (PCell) and secondary cells (SCells) measurements in the measurement report. The UE always performs reference signal received power (RSRP) and reference signal received quality (RSRQ) measurements for all the serving cells. The reporting configuration provides the RS type to be used for the measurement reporting of the serving cells. The network can also request the UE to include the beam level information for the serving cells. The requirements, however, do not solve all the problems related to measurement reporting, such as: (a) whether to include all quantities (RSRP, RSRQ and signal to interference and noise ratio (SINR)) based reporting for serving cells, and if so, where to find the corresponding configuration; (b) where to configure whether to include the beam level information of the serving cell; (c) how many beams to be included for the serving cell measurements; (d) how to select serving cells' beams to be included in the measurement report; and (e) what type of measurements (RS type, cell and/or beam, RSRP and/or RSRQ and/or SINR) to include for the neighboring cells in the serving frequencies.

Certain aspects of the present disclosure and their embodiments may provide solutions to these or other challenges. Particular embodiments include methods for a UE to determine which beams are to be reported for the serving cell. Particular embodiments include methods for the UE to determine which cell level measurements are to be reported for the serving cell. Particular embodiments include methods for the UE to determine which neighbor cell level and neighbor cell beam level measurements are to be reported for the serving frequencies.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 1:
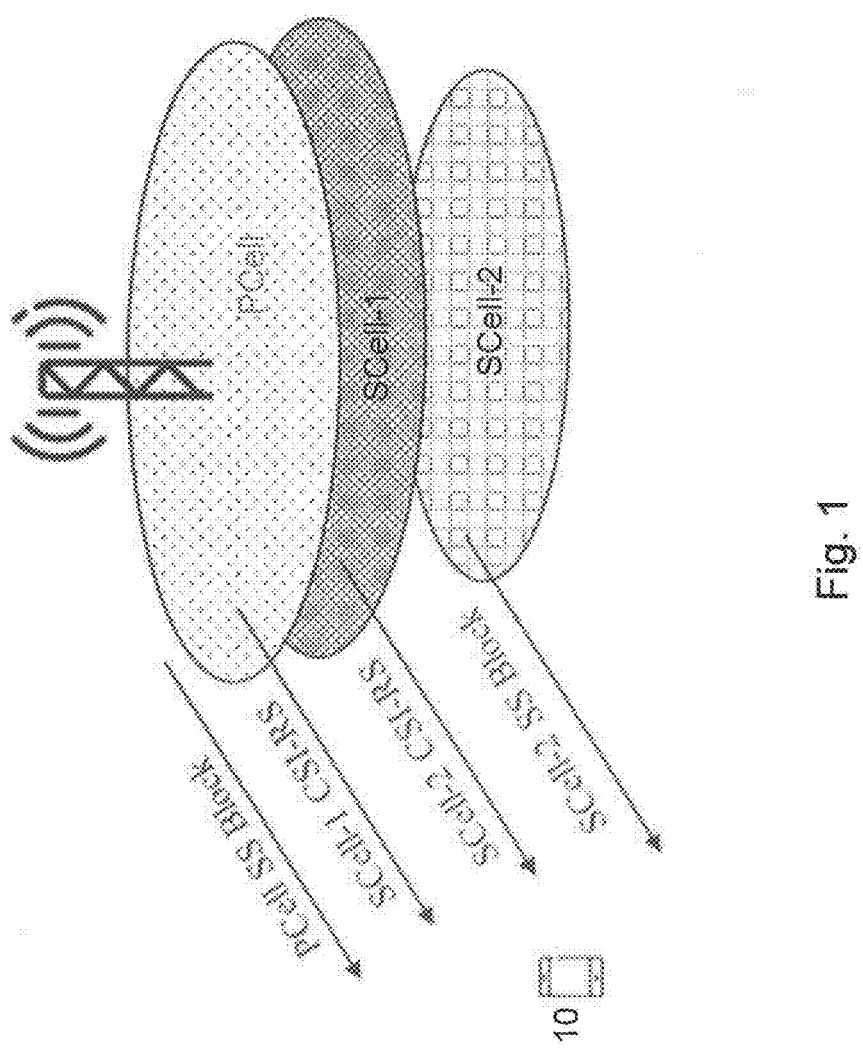
FIG. 1 is a block diagram illustrating example signal transmissions in a wireless network.

FIG. 1 is a block diagram illustrating example signal transmissions in a wireless network. A network, such as the network described with respect to FIG. 2, may configure UE 10 with 2 different SCells, SCell-1 and SCell-2. The network may also configure the CSI-RS corresponding to the SCells and for the PCell.

As illustrated, PCell may transmit a PCell synchronization signal (SS) block to UE 10 (i.e., PCell SS Block). SCell-1 may transmit a channel state indication reference signal (CSI-RS) to UE 10 (i.e., SCell-1 CSI-RS). SCell-2 may transmit a SS Block (i.e., SCell-2 SS Block) and a CSI-RS (SCell-2 CSI-RS) to UE 10.

Some embodiments include beam-level measurement reporting of PCell/PSCell/SCells. Particular embodiments are related to PCell/PSCell/SCells beam level reporting enabling/disabling flag configuration. Based on 3GPP specifications, the UE shall include the beam level measurements of PCell/PSCell/SCells in the measurement report if the network has configured the UE to do so. Where to provide the information, however, is not specified.

In some embodiments, a UE includes beam level measurements of PCell/PSCell/SCells only if the beam level reporting is enabled in the reportConfig for the corresponding measID that triggered the measurement report. The embodiment ensures that the UE provides the relevant information to the network without adding complexity.

Based on this embodiment, a specification might include the following. When a measurement report is triggered associated to a given measId, if the beamLevelReporting in the reportConfig associated with the measId is enabled, then include the beam measurements results for PCell/PSCell/SCells.

In some embodiments, the UE includes beam level measurements of PCell/PSCell/SCells only if the PCell/PSCell/SCells specific beam level reporting is enabled in the reportConfig for the corresponding measID that triggered the measurement report. This enables the network to get beam level reporting of only the measObject that triggered the measurement report, rather than getting beam level information for all serving cells.

Based on this embodiment, a specification might include the following. When a measurement report is triggered associated to a given measId, if the servingCellBeamLevelReporting in the reportConfig associated with the measId is enabled, then include the beam measurements results for PCell/PSCell/SCells.

In some embodiments, the UE includes beam level measurements of PCell/PSCell/SCells only if the beam level reporting is enabled in the measObject of the respective PCell/PSCell/SCells configurations. This prevents the network from over-burdening the UE with beam level information in the frequencies that have single beam transmission.

Based on this embodiment, a specification might include the following. When a measurement report is triggered associated to a given measId, if the servingCellBeamLevelReporting in the measObject associated with the configured serving cell is enabled, then include the beam measurement results for that serving cell.

Some embodiments are related to measurement quantities related configuration for PCell/PSCell/SCells beam level reporting. U.S. Provisional Application 62/544,379, filed on Aug. 11, 2017, describes a RSType to be used for beam level reporting of PCell/PSCell/SCells. Particular embodiments described herein further describe how to select the beams to be reported for PCell/PSCell/SCells, how many beams to be reported per PCell/PSCell/SCells, which RSType to be used for the beam reporting, and where the PCell/PSCell/SCells reporting related configuration is located.

In some embodiments, the UE includes only those quantities that are configured in the reportConfig for the corresponding measID that triggered the measurement report. The embodiment ensures that the UE provides the relevant information to the network without adding complexity.

Based on this embodiment, a specification might include the following. When a measurement report is triggered associated to a given measId, include the beam measurements results for PCell/PSCell/SCells based on the report quantities of the reportConfig associated with the measId.

In some embodiments, the UE includes only those quantities that are configured in the measObjects of the individual PCell/PSCell/SCells for the reporting of respective PCell/PSCell/SCells' beam level measurements (e.g., servingCellBeamReportQuantity in the ASN.1 specified below). Based on this embodiment, a specification might include the following. When a measurement report is triggered associated to a given measId, include the beam measurements results for PCell/PSCell/SCells based on the report quantities as configured in the servingCellBeamReportQuantity field of the measObject.

An example of how this information is configured is provided in the ASN.1 below (only relevant sections are provided).

MeasObjectNR Information Element

```
-- ASN1START
MeasObjectEUTRA ::=                         SEQUENCE {
    carrierFreq                                 ARFCN-ValueEUTRA,
    allowedMeasBandwidth                        AllowedMeasBandwidth,
    presenceAntennaPort1                        PresenceAntennaPort1,
    neighCellConfig                             NeighCellConfig,
    servingCellBeamReportQuantity
      ENUMERATED{RSRP,RSRQ,SINR,            RSRP&RSRQ,       RSRP&SINR,
RSRQ&SINR,All}
    offsetFreq                                  Q-OffsetRange
      DEFAULT dB0,
```

In some embodiments, the UE includes only those quantities that are configured in the measConfig for the corresponding measID that triggered the measurement report (e.g., servingCellBeamReportQuantity in the ASN.1 specified below). Based on this embodiment, a specification might include the following. When a measurement report is triggered associated to a given measId, include the beam measurements results for PCell/PSCell/SCells based on the report quantities as configured in the servingCellBeamReportQuantity field of the measConfig.

An example of how this information is configured is provided in the ASN.1 below (only relevant sections are provided)

MeasConfig Information Element

```
-- ASN1START
MeasConfig ::=                                          SEQUENCE {
    -- Measurement objects
    measObjectToRemoveList                                  MeasObjectToRemoveList
            OPTIONAL,        -- Need ON
    measObjectToAddModList                                  MeasObjectToAddModList
            OPTIONAL,        -- Need ON
    -- Reporting configurations
    reportConfigToRemoveList                        ReportConfigToRemoveList
      OPTIONAL,  -- Need ON
    reportConfigToAddModList                        ReportConfigToAddModList
      OPTIONAL,  -- Need ON
    -- Measurement identities
    measIdToRemoveList                                      MeasIdToRemoveList
            OPTIONAL,        -- Need ON
    measIdToAddModList                                              MeasIdToAddModList
                            OPTIONAL, -- Need ON -- Other parameters
    quantityConfig                                          QuantityConfig
```

-continued

```
              OPTIONAL,      -- Need ON
  measGapConfig                              MeasGapConfig
                      OPTIONAL, -- Need ON
  servingCellBeamReportQuantity
    ENUMERATED{RSRP,RSRQ,SINR,          RSRP&RSRQ,  RSRP&SINR,
RSRQ&SINR,All}
    s-Measure                                  RSRP-Range
              OPTIONAL,     --Need ON
  preRegistrationInfoHRPD               PreRegistrationInfoHRPD
    OPTIONAL,  -- Need OP
```

In some embodiments, the UE includes all the available measurement quantities of the PCell/PSCell/SCells. Based on this embodiment, a specification might include the following. When a measurement report is triggered associated to a given measId, include all the beam level measurements results for PCell/PSCell/SCells.

Particular embodiments are related to selection of beams to be reported for PCell/PSCell/SCells beam level reporting. For the beams to be included in the measurement report, the UE can include the strongest X number of beams that are above a threshold (the threshold as configured for the cell quality derivation). The value of X (in reportConfig for example) and the threshold (in measObject for example) may be network configured.

If the UE is configured with multiple SCells, then the UE will have more than one measObject and thus possibly different threshold values. When it comes to beam level reporting of the PCell/PSCell/SCells, the UE has different ways to choose the beam that is potentially included in the measurement report.

In some embodiments, the UE uses the threshold defined in the measObject related to respective PCell/SCells/PSCell measObject (i.e., UE will always perform beam selection based on the respective measurement object specific configurations). Based on this embodiment, a specification may include the following. When a measurement report is triggered associated to a given measId, include the beam measurements results of PCell/PSCell/SCells based on the beam measurements of PCell/PSCell/SCells that are above the threshold as configured in the respective measObject of the PCell/PSCell/SCell, In some embodiments, the UE uses the threshold defined in the measObject related to the measId that triggered the event (i.e., UE has many beam measurements, but only include the ones above that threshold). Based on this embodiment, a specification might include the following. When a measurement report is triggered associated to a given measId, include the beam measurements results for PCell/PSCell/SCells based on the beam measurements of PCell/PSCell/SCells that are above the threshold as configured in the measObject associated with the measId.

Regarding the number of beams to be included in the measurement report, 3GPP specifies that the reportConfig provides the value of X that acts as the maximum limit on the number of beams to be included in the measurement report.

In some embodiments, the UE includes all the available beam information of PCell/PSCell/SCells independent of the X value as configured in the reportConfig associated to the measId that triggered the measurement report. Providing so much measurement information to the network, however, may result in a significantly large reporting.

Based on this embodiment, a specification might include the following. When a measurement report is triggered associated to a given measId, include the beam measurements results for PCell/PSCell/SCells based on all the beam measurements of PCell/PSCell/SCells that are above the threshold as configured in the measObject associated with this measId. Alternatively, when a measurement report is triggered associated to a given measId, include the beam measurement results of PCell/PSCell/SCells based on all the beam measurements of PCell/PSCell/SCells that are above the threshold as configured in the respective measObject of the PCell/PSCell/SCell.

In some embodiments, the UE includes up to X beams, beams including those of the PCell/PSCell/SCells, wherein the value X is configured in the reportConfig associated to the measId that triggered the measurement report. This restricts the measurement report size to a smaller size.

Based on this embodiment, a specification might include the following. When a measurement report is triggered associated to a given measId, include up to X strongest beams based on the X as configured in the reportConfig associated with the measId that triggered the measurement report based on: (a) the X strongest beams are chosen from amongst the PCell/PSCell/SCells and the cells in the cellsTriggeredList; or (b) the beam measurements of PCell/PSCell/SCells that are above the threshold as configured in the measObject associated with this measId. Alternatively, when a measurement report is triggered associated to a given measId, include up to X strongest beams based on the X as configured in the reportConfig associated with the measId that triggered the measurement report based on: (a) the X strongest beams are chosen from among the PCell/PSCell/SCells and the cells in the cellsTriggeredList; or (b) all the beam measurements of PCell/PSCell/SCells that are above the threshold as configured in the respective measObject of the PCell/PScell/Scell.

Particular embodiments include cell-level measurement reporting of PCell/PSCell/SCells. The reference signal to be used for serving cell reporting may be configured in reporting config. A specification may include the following. When a measurement report is triggered associated to a given measId, include the available measurements results for PCell/PSCell/SCells based on the same RSType of the reportConfig associated with this measId.

Although the 3GPP specification may provide the UE information related to what reference signal type to use for the measurements, it does not specify which quantities are supposed to be reported by the UE. Currently, the UE always perform RSRP and RSRQ based measurements (i.e., if a measurement report is triggered associated to any measurement ID, the UE includes all available measurement results for PCell and configured SCells).

However, reporting both RSRP and RSRQ (and possibly SINR) for all the PCell/PSCell/SCells could be unnecessary in most scenarios as the network might use only one of those measurement quantities. Also, as the number of configured SCells increases, the overhead may be large. The following embodiments provide ways to resolve this problem.

In some embodiments, the UE includes only those quantities that are configured in the reportConfig for the corresponding measID that triggered the measurement report. Based on this embodiment, a specification might include the following. When a measurement report is triggered associated to a given measId, include the cell level measurements results for PCell/PSCell/SCells based on the report quantities of the reportConfig associated with the measId.

In some embodiments, the UE includes only those quantities that are configured in the measObjects of the individual PCell/PSCell/SCells for the reporting of respective PCell/PSCell/SCells' measurements (e.g., servingCellReportQuantity in the ASN.1 specified below). Based on this embodiment, a specification may include the following. When a measurement report is triggered associated to a given measId, include the cell level measurements results for PCell/PSCell/SCells based on the report quantities as configured in the servingCellReportQuantity field of the measObject.

An example of how this information is configured is provided in the ASN.1 below (only relevant sections are provided).

MeasObjectNR Information Element

```
-- ASN1START
MeasObjectEUTRA ::=           SEQUENCE {
    carrierFreq                   ARFCN-ValueEUTRA,
    allowedMeasBandwidth          AllowedMeasBandwidth,
    presenceAntennaPort1          PresenceAntennaPort1,
    neighCellConfig               NeighCellConfig,
    servingCellReportQuantity     ENUMERATED{RSRP,RSRQ,SINR,
RSRP&RSRQ, RSRP&SINR, RSRQ&SINR,All}
    offsetFreq                    Q-OffsetRange
        DEFAULT dB0,
```

In some embodiments, the UE includes only those quantities that are configured in the measConfig for the corresponding measID that triggered the measurement report (e.g., servingCellReportQuantity in the ASN.1 specified below). Based on this embodiment, a specification may include the following. When a measurement report is triggered associated to a given measId, include the cell level measurements results for PCell/PSCell/SCells based on the report quantities as configured in the servingCellReportQuantity field of the measConfig.

An example of how this information is configured is provided in the ASN.1 below (only relevant sections are provided).

MeasConfig Information Element

```
-- ASN1START
MeasConfig ::=                      SEQUENCE {
    -- Measurement objects
    measObjectToRemoveList              MeasObjectToRemoveList
        OPTIONAL,     -- Need ON
    measObjectToAddModList              MeasObjectToAddModList
        OPTIONAL,     -- Need ON
    -- Reporting configurations
    reportConfigToRemoveList            ReportConfigToRemoveList
        OPTIONAL,  -- Need ON
    reportConfigToAddModList            ReportConfigToAddModList
        OPTIONAL,  -- Need ON
    -- Measurement identities
    measIdToRemoveList                  MeasIdToRemoveList
        OPTIONAL,     -- Need ON
    measIdToAddModList                  MeasIdToAddModList
                                        OPTIONAL,  -- Need ON
    -- Other parameters
    quantityConfig                      QuantityConfig
        OPTIONAL,     -- Need ON
    measGapConfig                       MeasGapConfig
                                        OPTIONAL,  -- Need ON
    servingCellReportQuantity           ENUMERATED{RSRP,RSRQ,SINR,
RSRP&RSRQ, RSRP&SINR, RSRQ&SINR,All}
    s-Measure                           RSRP-Range
                  OPTIONAL,     -- Need ON
    preRegistrationInfoHRPD             PreRegistrationInfoHRPD
        OPTIONAL,  -- Need OP
```

In some embodiments, the UE includes all available quantities of the PCell/PSCell/SCells. Based on this embodiment, a specification may include the following. When a measurement report is triggered associated to a given measId, include all the cell level measurements results for PCell/PSCell/SCells.

Particular embodiments include neighbor cell measurement reporting in serving frequencies. The network can configure the UE to report best neighbor cells in the serving frequencies. In LTE, the reportConfig provides information about whether to include neighbor cell measurements. If the reportConfig associated with the measId that triggered the measurement reporting includes reportAddNeighMeas, then for each serving frequency for which measObjectId is referenced in the measIdList, other than the frequency corresponding with the measId that triggered the measurement reporting, set the measResultServFreqList to include within measResultBestNeighCell the physCellId and the quantities of the best non-serving cell, based on RSRP, on the concerned serving frequency.

3GPP, however, does not specify whether the UE needs to include beam level measurements of the neighbor cells in the serving frequencies, what measurement quantities are included in the measurement report for cell level measurements and beam level measurements, and what reference signal type to be considered for the measurements. Particular embodiments include beam level reporting of neighbor cell in serving frequencies.

In some embodiments, the UE does not include beam level measurements of serving frequency neighbor cells at all. This reduces the measurement report overhead. However, it limits the information provided to the network that that may help in decision making (e.g., handover/CA set-up, etc.).

In some embodiments, the UE includes beam level measurements of serving frequency neighbor cells only if the beam level reporting is enabled in the reportConfig for the corresponding measID that triggered the measurement report. The embodiment ensures that the UE provides the relevant information to the network without adding complexity. The beam measurements might not be reported if there are other eligible beams to be reported and a limitation of X beams is used.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, if the reportConfig associated with the measId that triggered the measurement reporting includes includeBeamLevelReporting and is set to TRUE, then include the beam level measurements related to the best neighbor cell for the corresponding serving frequency for reporting as part of the evaluation of best X beams to be reported as configured in the reportConfig associated with the measId that triggered the measurement report.

In some embodiments, the UE includes beam level measurements of serving frequency neighbor cells only if the beam level reporting is enabled in the measObject of the corresponding serving frequency. This embodiment provides a unique method for the network to limit neighbor cell information to particular serving frequencies (e.g., frequencies deemed important at any particular time). The beam measurements might not be reported if there are other eligible beams to be reported and a limitation of X beams is used.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, if the measObject associated with the serving frequency includes includeBeamLevelReporting and is set to TRUE, then include the beam level measurements related to the best neighbor cell for the corresponding serving frequency for reporting as part of the evaluation of best X beams to be reported as configured in the reportConfig associated with the measId that triggered the measurement report.

Particular embodiments include measurement quantities to be reported for the cell/beam level reporting of neighbor cell in serving frequencies. In some embodiments, the UE includes the measurement quantities related to the neighbor cell of the serving frequencies that are configured in the reportConfig for the corresponding measID that triggered the measurement report. The embodiment ensures that the UE provides the relevant information to the network without adding complexity.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the beam level measurement quantities of the best neighbor cell as configured in the reportConfig associated with the measId that triggered the measurement report.

In some embodiments, the UE includes those measurement quantities related to the neighbor cell of the serving frequencies that are configured in the measObject of the corresponding serving frequency. This provides the flexibility for reporting specific quantities for specific frequencies.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the beam level measurement quantities of the best neighbor cell as configured in the servingCellBeamReportQuantity as configured in the corresponding measObject.

In some embodiments, the UE includes the measurement quantities related to the neighbor cell of the serving frequencies that are configured in the measConfig of the corresponding serving frequency (servingCellBeamReportQuantity). This provides the flexibility to report specific quantities for specific frequencies.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the beam level measurement quantities of the best neighbor cell as configured in the servingCellBeamReportQuantity as configured in the corresponding measConfig.

Particular embodiments include a reference signal type to be used for the cell/beam level reporting of neighbor cell in serving frequencies. In some embodiments, the UE includes the measurements of the best neighbor cell (cell level embodiments are described, but similar embodiments apply for beam measurement) of the serving frequencies that are based on the reference signal type configured in the reportConfig for the corresponding measID that triggered the measurement report. The embodiment ensures that the UE provides the relevant information to the network without adding complexity.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the cell level measurements of the best neighbor cell measured based on the RSType as configured in the reportConfig associated with the measId that triggered the measurement report.

In some embodiments, the UE includes the cell (cell level embodiments are described, but similar embodiments apply for beam measurement) level measurements based on the reference signal type as configured in the measObject of the corresponding serving frequency. This provides the flexibility for specific reference signal type-based measurements for specific frequencies.

Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the cell level measurements of the best neighbor cell measured based on the RSType as configured in the measObject of the corresponding serving frequency.

In some embodiments, the UE includes the cell (cell level embodiments are described, but similar embodiments apply for beam measurement) level measurements based on the reference signal type as configured in the measConfig. Based on this embodiment, a specification may include the following. If the reportConfig associated with the measId that triggered the measurement reporting includes reportAddNeighMeas, for each serving frequency for which measObjectId is referenced in the measIdList, other than the frequency corresponding with the measId that triggered the measurement reporting, include the cell level measurements of the best neighbor cell measured based on the RSType as configured in the measConfig.

Figure 2:
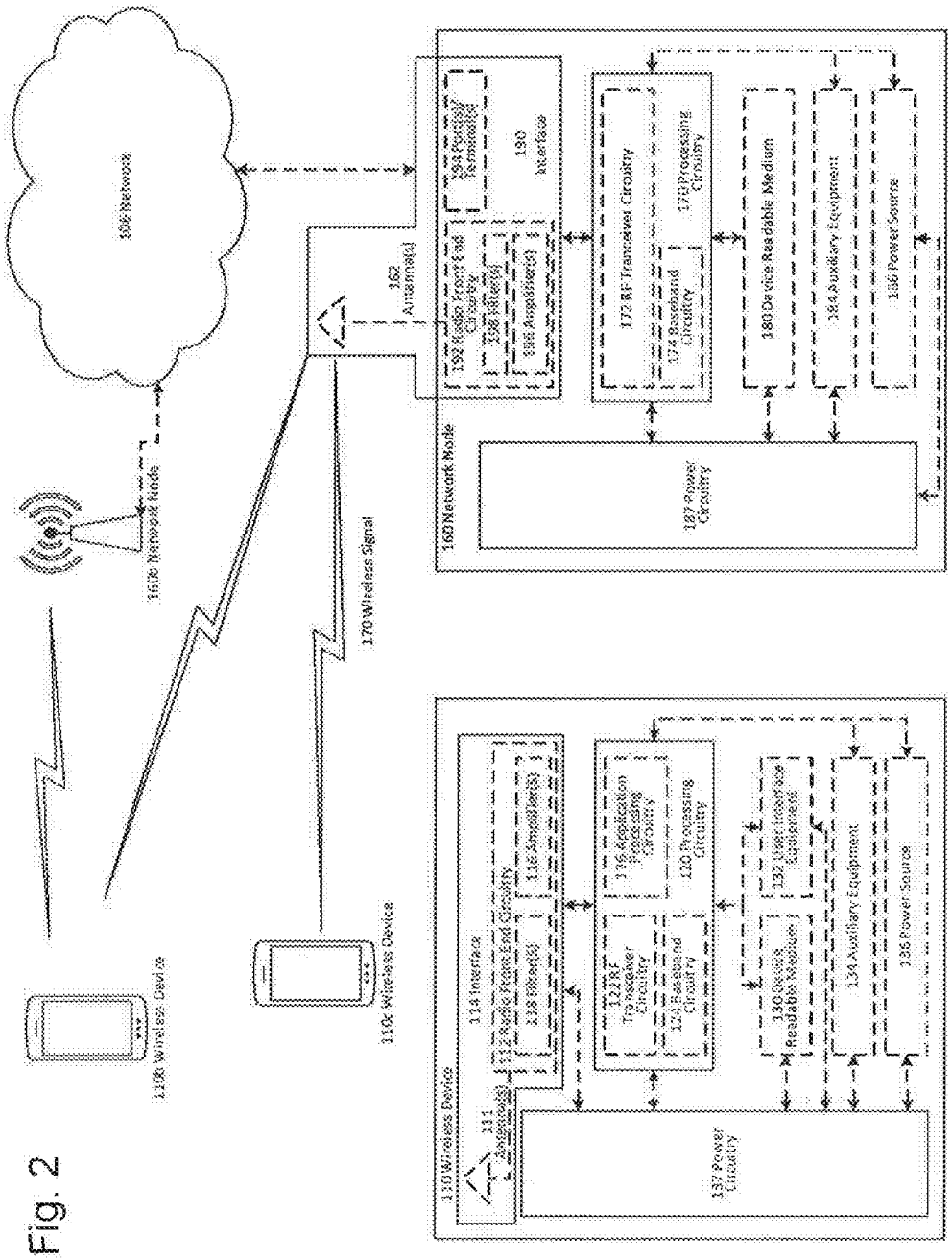
FIG. 2 illustrates an example wireless network, according to certain embodiments.

FIG. 2 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 3:
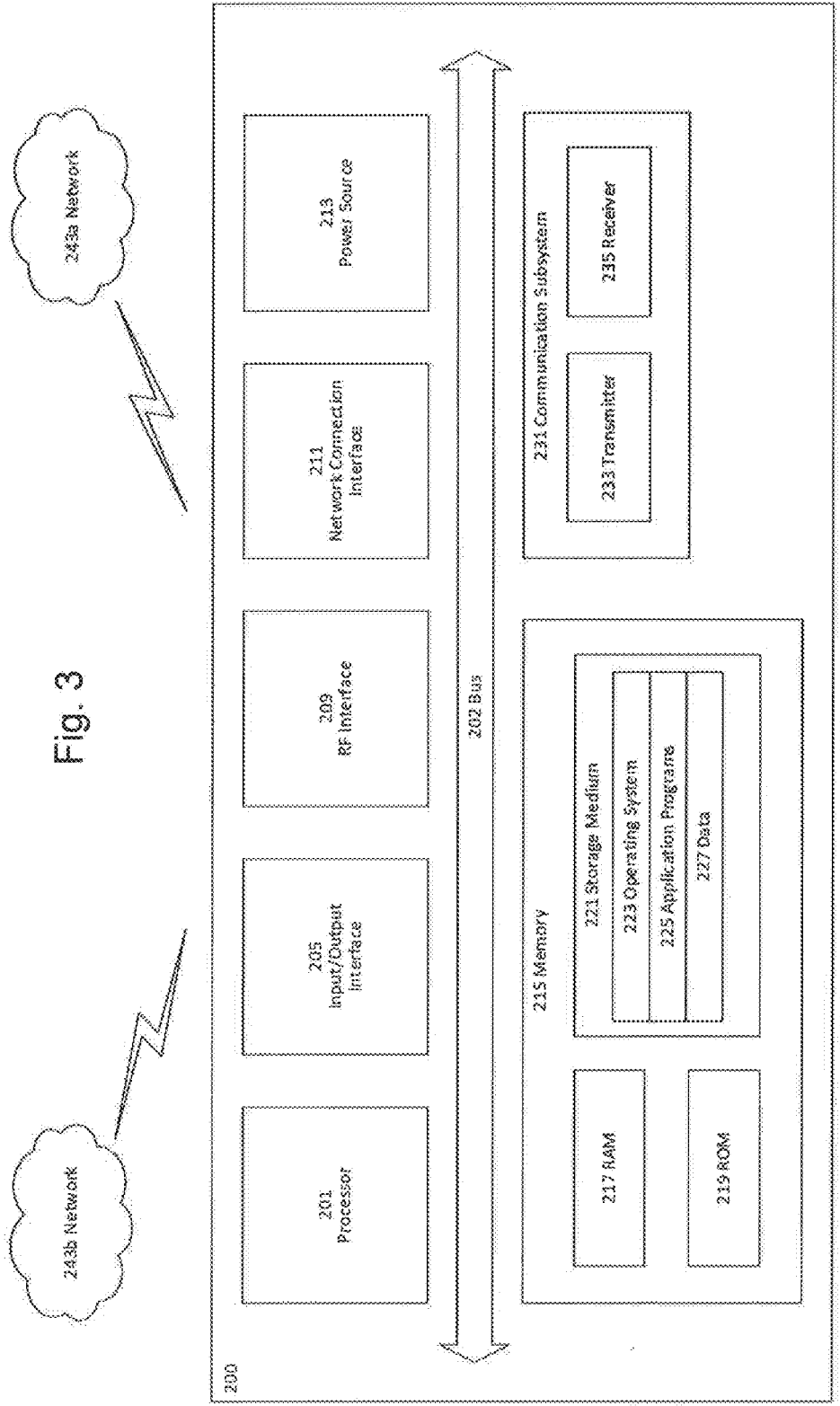
FIG. 3 illustrates an example user equipment, according to certain embodiments.

FIG. 3 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 3, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 3, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like, Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 4:
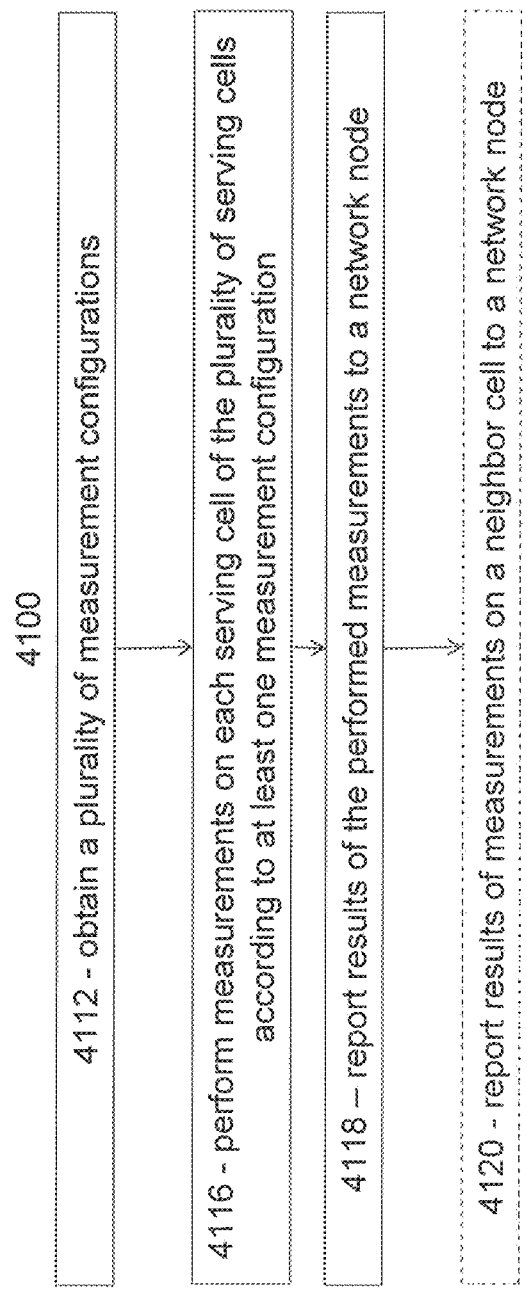
FIG. 4 is a flowchart illustrating an example method in a user equipment for measurement configuration and reporting, according to certain embodiments.

FIG. 4 is a flowchart illustrating an example method in a wireless device for measurement configuration and reporting, according to certain embodiments. In particular embodiments, one or more steps of FIG. 4 may be performed by wireless device 110 described with respect to FIG. 2.

The method begins at step 4112 with a wireless device (e.g., wireless device 110) obtaining a plurality of measurement configurations from a network node (e.g., network node 160). The wireless device may be associated with a plurality of serving cells. Each measurement configuration includes a measurement identifier, a measurement object, and a report configuration. One or more measurement configurations may apply to the carrier frequencies of one or more of the serving cells. The measurement configuration may include any of the measurement configurations of the embodiments and examples described above.

For example, each measurement configuration of the plurality of measurement configurations may include one or more of an indication of whether beam level measurement is enabled for the associated serving cell, a number of beams to measure, a signal threshold, and/or a reference signal to measure (e.g., CSI-RS, SS, etc.) for the associated carrier frequency. Obtaining the measurement configuration may comprise receiving a radio resource control (RRC) message, or any other suitable signaling between a network node and a wireless device.

At step 4116, the wireless device performs measurements on each serving cell of the plurality of serving cells according to at least one measurement configuration of the plurality of measurement configurations. For example, wireless device 110 may perform measurements on signals from any or all serving network nodes 160.

In particular embodiments, performing measurements on each serving cell comprises performing cell or beam level measurements based on the measurement configuration associated with the measurement identifier for which the measurement report triggering event is received. In some embodiments, performing measurements on each serving cell may comprise performing cell or beam level measurements based on the measurement configuration associated with the serving cell being measured. The wireless device may perform the measurements according to any of the embodiments and examples described above.

At some time, a measurement report associated with a measurement identifier is triggered. For example, wireless device 110 may detect a triggering event, such as detecting a particular measurement is above or below a threshold. A triggering event may include, but is not limited to, any of the triggering events defined in 3GPP 36.331.

At step 4118, the wireless device reports results of the performed measurements to a network node. For example, wireless device 110 may report measurement results to network node 160 according to the measurement configuration obtained at step 4112. The wireless device may report results of the performed measurements for the plurality of serving cells to a network node according to the report configuration of the measurement configuration with the measurement identifier associated with the triggered event.

At step 4129, the wireless device may report results of measurements on a neighbor cell to a network node. In particular embodiments, the wireless device may report results according to a measurement configuration associated with a serving cell that uses the same frequency as the neighbor cell. The neighbor cell may be one of a plurality of neighbor cells, and based on the performed measurements, the neighbor cell signal quality may be better than the other neighbor cells of the plurality of neighbor cells. The wireless device may report the measurements according to any of the embodiments and examples described above.

Modifications, additions, or omissions may be made to method 4100 of FIG. 4. Additionally, one or more steps in the method of FIG. 4 may be performed in parallel or in any suitable order.

Figure 5:
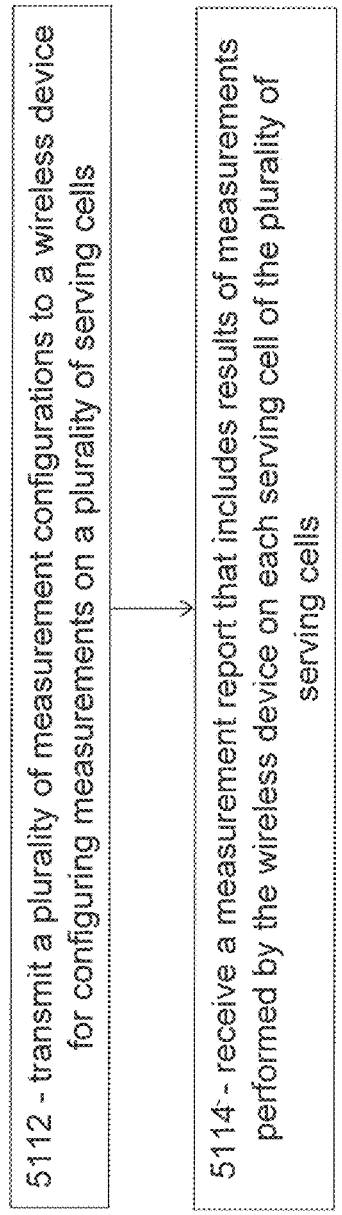
FIG. 5 is a flowchart illustrating an example method in a network node for measurement configuration and reporting, according to certain embodiments.

FIG. 5 is a flowchart illustrating an example method in a network node for measurement configuration, according to certain embodiments. In particular embodiments, one or more steps of FIG. 5 may be performed by network node 160 described with respect to FIG. 2.

The method begins at step 5112, wherein a network node (e.g., network node 160) transmits a plurality of measurement configurations to a wireless device (e.g., wireless device 110) for configuring measurements on a plurality of serving cells. Each measurement configuration of the plurality of measurement configurations comprises a measurement identifier, a measurement object, and a report configuration. The measurement configuration may include any of the measurement configurations of the embodiments and examples described above.

For example, each measurement configuration of the plurality of measurement configurations may include one or more of an indication of whether beam level measurement is enabled for the associated serving cell, a number of beams to measure, a signal threshold, and/or a reference signal type (e.g., CSI-RS, SS, etc.) for the associated serving cell. Transmitting the measurement configuration may comprise transmitting a RRC message, or any other suitable signaling between a network node and a wireless device.

At step 5114, the network node receives, from the wireless device, a measurement report that includes results of measurements performed by the wireless device on each serving cell of the plurality of serving cells according to a report configuration of a measurement configuration with a measurement identifier associated with the event that triggered the measurement report.

In particular embodiments, the measurement report includes results of measurements performed by the wireless device on each serving cell by performing cell or beam level measurements based on the measurement configuration associated with the measurement identification for which the wireless device received a measurement report triggering event. The measurement report may include results of measurements performed by the wireless device on each serving cell by performing cell or beam level measurements based on the measurement configuration associated with the serving cell being measured.

In particular embodiments, the measurement report further includes results of measurements the wireless device performed on a neighbor cell according to at least one measurement configuration of the plurality of measurement configurations. The measurements the wireless device performed on the neighbor cell may have been performed based on the measurement configuration associated with the serving cell for which the wireless device received a measurement report triggering event. The measurements the wireless device performed on the neighbor cell may have been performed based on the measurement configuration associated with a serving cell that uses the same frequency as the neighbor cell.

Modifications, additions, or omissions may be made to method 5100 of FIG. 5. Additionally, one or more steps in the method of FIG. 5 may be performed in parallel or in any suitable order.

Figure 6:
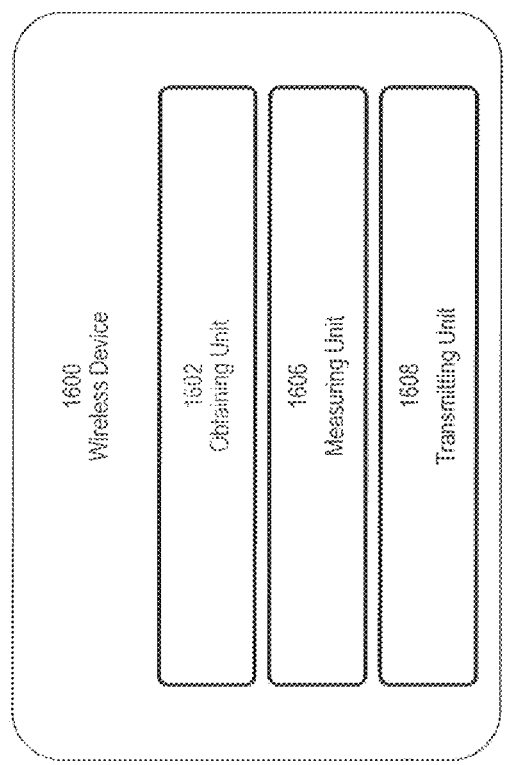
FIG. 6 illustrates an example wireless device, according to certain embodiments.

FIG. 6 illustrates an example wireless device, according to certain embodiments. The apparatus may be implemented in a wireless device (e.g., wireless device 110 shown in FIG. 2). Apparatus 1600 is operable to carry out the example method described with reference to FIG. 4 and possibly any other processes or methods disclosed herein. It is also to be understood that the method of FIG. 4 is not necessarily carried out solely by apparatus 1600. At least some operations of the method can be performed by one or more other entities, including virtual apparatuses.

Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1602, measuring unit 1606, transmitting unit 1608, and any other suitable units of apparatus 1600 to perform corresponding functions according one or more embodiments of the present disclosure.

As illustrated in FIG. 6, apparatus 1600 includes obtaining unit 1602, measuring unit 1606, and transmitting unit 1608. In certain embodiments, obtaining unit 1602 may receive measurement configurations for a plurality of serving cells from network node 160. The measurement configurations may comprise any of the measurement configurations in the embodiments and examples described above. Measuring unit 1606 may measure signals from one or more serving cells. The measuring may be in accordance with one of the obtained measurement configurations. Transmitting unit 1608 may transmit a measurement report to a network node.

Figure 7:
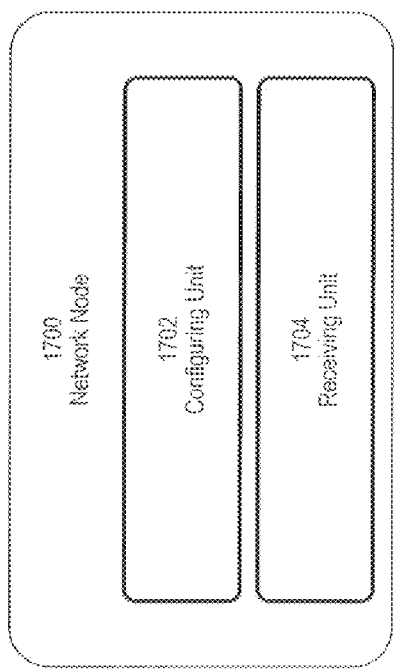
FIG. 7 illustrates an example network node, according to certain embodiments.

FIG. 7 illustrates an example network node, according to certain embodiments. The apparatus may be implemented in a network node (e.g., network node 160 shown in FIG. 2). Apparatus 1700 is operable to carry out the example method described with reference to FIG. 5 and possibly any other processes or methods disclosed herein. It is also to be understood that the method of FIG. 5 is not necessarily carried out solely by apparatus 1700. At least some operations of the method can be performed by one or more other entities, including virtual apparatuses.

Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuring unit 1702, receiving unit 1704, and any other suitable units of apparatus 1700 to perform corresponding functions according one or more embodiments of the present disclosure.

As illustrated in FIG. 7, apparatus 1700 includes configuring unit 1702 and receiving unit 1704. In certain embodiments, configuring unit 1704 may transmit measurement configurations to a wireless device. Receiving unit 1704 may receive a measurement report from the wireless device.

Figure 8:
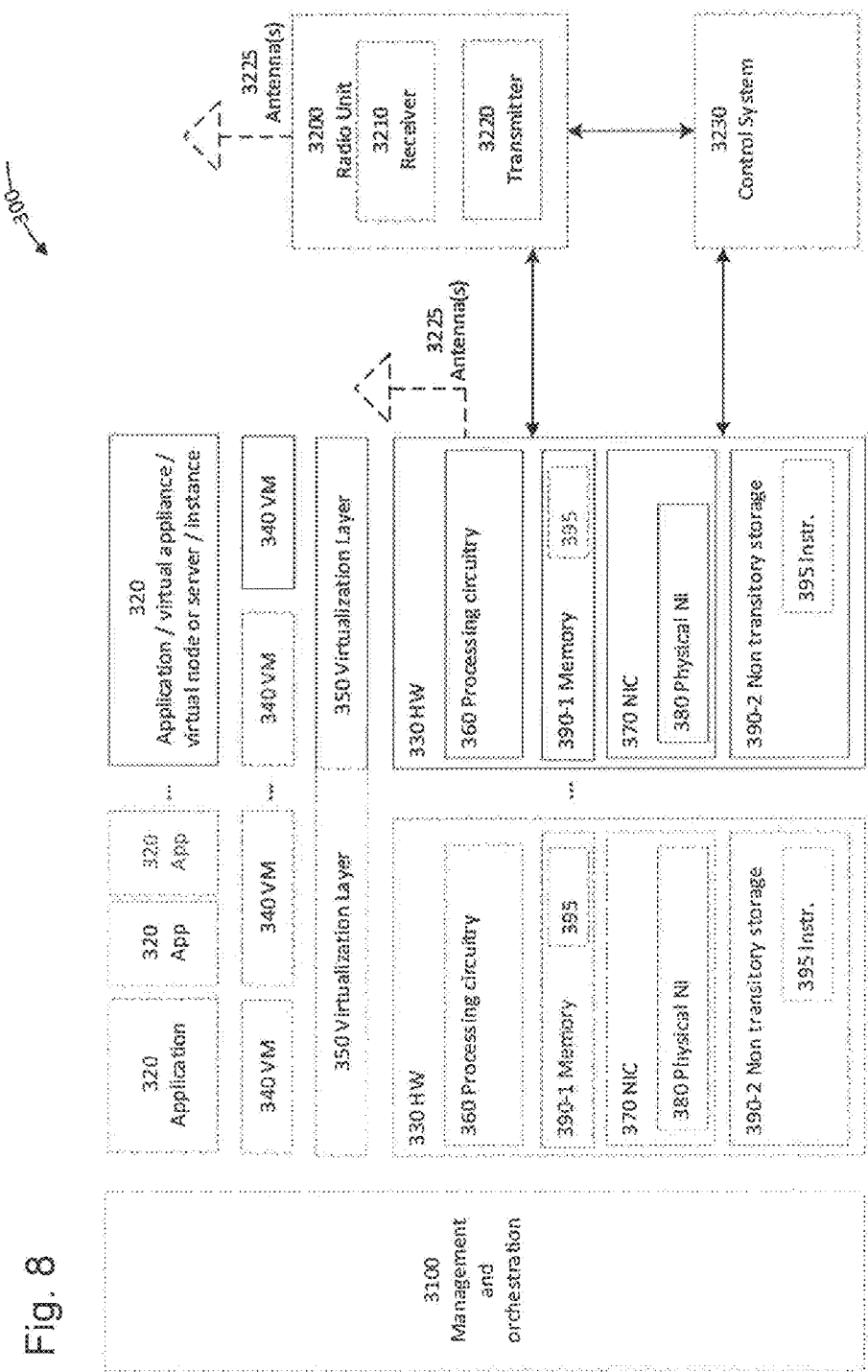
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 9:
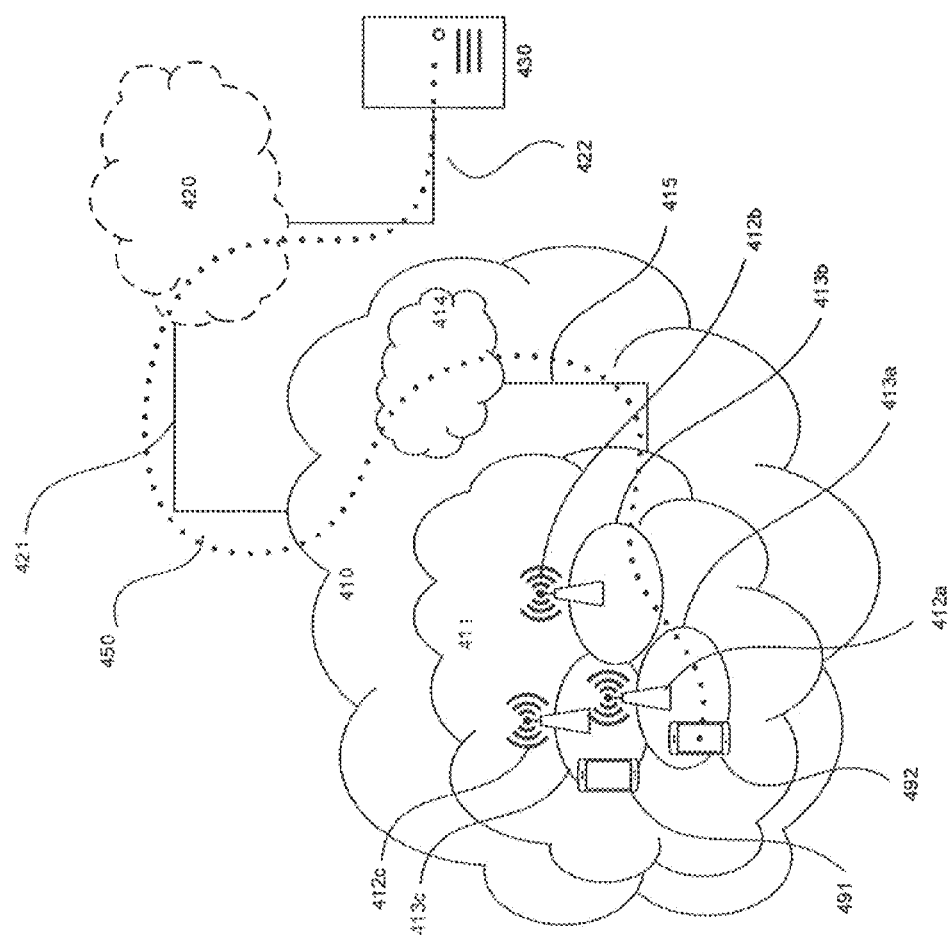
FIG. 9 illustrates an example telecommunication network connected via an, intermediate network to a host computer, according to certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
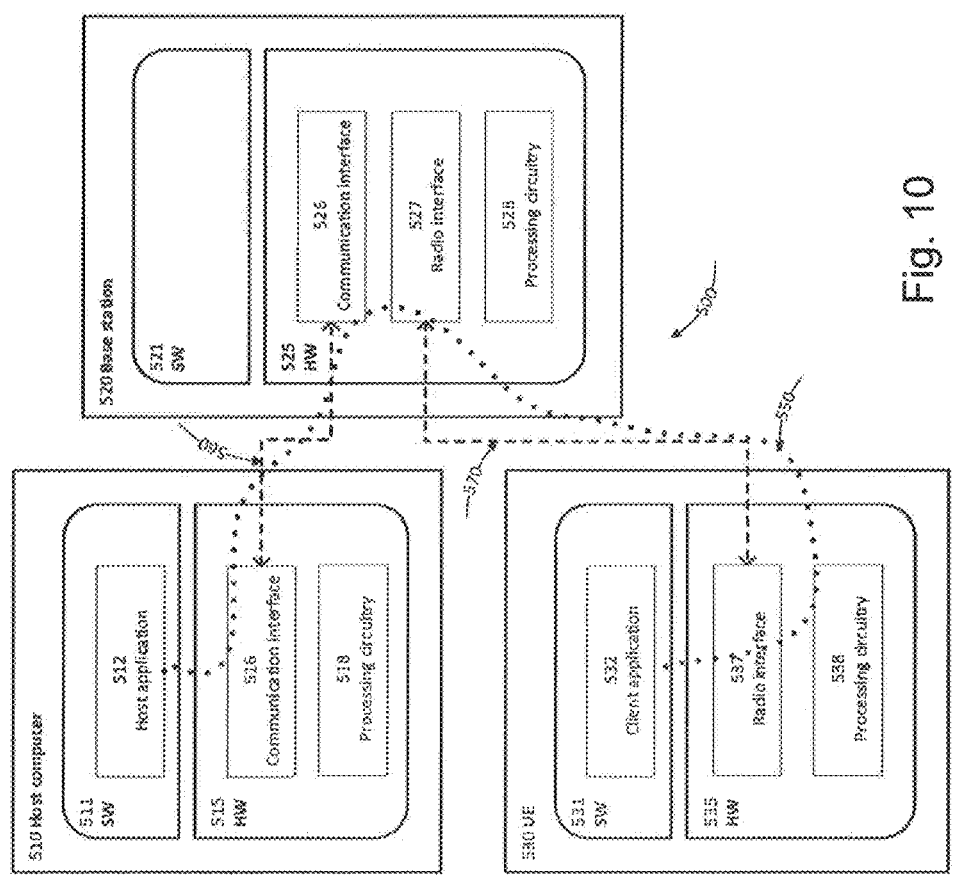
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 5 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of LIE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
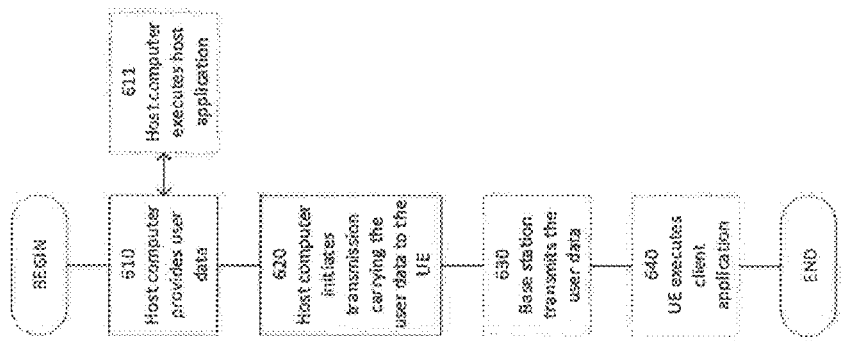
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
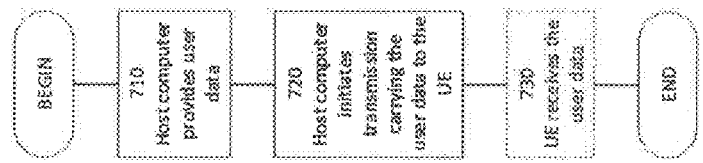
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
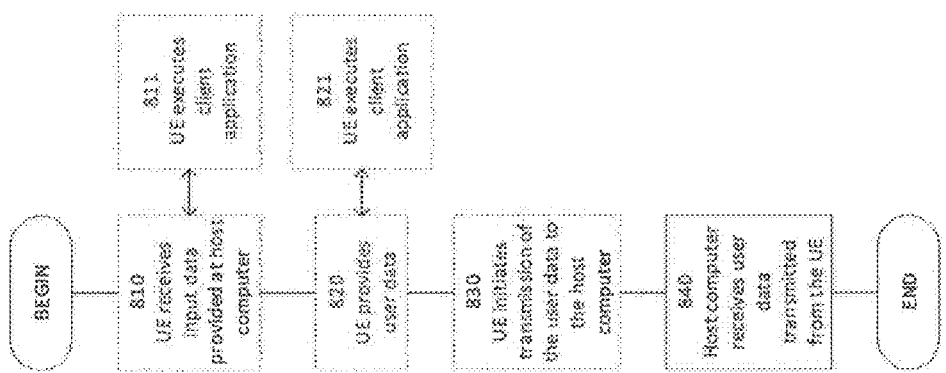
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
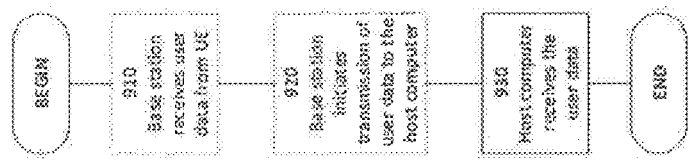
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used herein. If there is an inconsistency between abbreviations, preference should be given to how it is used above.

Abbreviation Explanation

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SINR Signal to Interference plus Noise Ratio
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for measurement configuration and reporting performed by a wireless device, wherein the wireless device is associated with a plurality of serving cells, and the method comprises:
obtaining a plurality of measurement configurations from a network node, each measurement configuration of the plurality of measurement configurations comprising a measurement identifier, a measurement object, and a report configuration;
performing measurements on each serving cell of the plurality of serving cells according to at least one measurement configuration of the plurality of measurement configurations; and
when a measurement report associated with a measurement identifier is triggered, reporting results of the performed measurements for the plurality of serving cells to a network node according to the report configuration of the measurement configuration with the measurement identifier associated with the triggered event,
wherein each measurement configuration of the plurality of measurement configurations includes a number of beams to report, and reporting results of the performed measurements for the plurality of serving cells comprises reporting measurements for the number of beams according to the report configuration of the measurement configuration with the measurement identifier associated with the triggered event.

2. The method of claim 1, wherein each measurement configuration of the plurality of measurement configurations includes an indication of whether beam level measurement is enabled, and reporting results of the performed measurements for the plurality of serving cells comprises reporting beam level measurements according to the report configuration of the measurement configuration with the measurement identifier associated with the triggered event.

3. The method of claim 1, wherein each measurement configuration of the plurality of measurement configurations includes a beam signal threshold, and reporting results of the performed measurements for the plurality of serving cells comprising reporting measurements for the beams with beam signal qualities better than the beam signal threshold of the measurement object of the measurement configuration with the measurement identifier associated with the triggered event.

4. The method of claim 1, wherein each measurement configuration of the plurality of measurement configurations includes a beam signal threshold, and reporting results of the performed measurements for the plurality of serving cells comprising reporting measurements for the beams with beam signal qualities better than the beam signal threshold of a measurement object associated with the serving cell.

5. The method of claim 1, wherein each measurement configuration of the plurality of measurement configurations includes a reference signal type, and reporting results of the performed measurements for the plurality of serving cells comprising reporting measurements based on the reference signal type of the report configuration of the measurement configuration with the measurement identifier associated with the triggered event, wherein the reference signal type comprises at least one of a channel state information reference signal (CSI-RS) or a synchronization symbol (SS).

6. The method of claim 1, further comprising reporting results of measurements on a neighbor cell to a network node according to a measurement configuration associated with a serving cell that uses the same frequency as the neighbor cell.

7. The method of claim 6, wherein the neighbor cell is one of a plurality of neighbor cells, and based on the performed measurements, the neighbor cell signal quality is higher than the other neighbor cells of the plurality of neighbor cells.

8. A computer program product comprising a non-transitory computer readable medium storing computer readable program code, the computer readable program code operable, when executed by processing circuitry, to perform the methods of claim 1.

9. A wireless device associated with a plurality of serving cells, the wireless device comprising processing circuitry operable to:
    obtain a plurality of measurement configurations from a network node, each measurement configuration of the plurality of measurement configurations comprising a measurement identifier, a measurement object, and a report configuration;
    perform measurements on each serving cell of the plurality of serving cells according to at least one measurement configuration of the plurality of measurement configurations; and
    when a measurement report associated with a measurement identifier is triggered, report results of the performed measurements for the plurality of serving cells to a network node according to the report configuration of the measurement configuration with the measurement identifier associated with the triggered event,
        wherein each measurement configuration of the plurality of measurement configurations includes a number of beams to report, and the processing circuitry is operable to report the results of the performed measurements for the plurality of serving cells by reporting measurements for the number of beams according to the report configuration of the measurement configuration with the measurement identifier associated with the triggered event.

10. The wireless device of claim 9, wherein each measurement configuration of the plurality of measurement configurations includes an indication of whether beam level measurement is enabled, and the processing circuitry is operable to report the results of the performed measurements for the plurality of serving cells by reporting beam level measurements according to the report configuration of the measurement configuration with the measurement identifier associated with the triggered event.

11. The wireless device of claim 9, wherein each measurement configuration of the plurality of measurement configurations includes a beam signal threshold, and the processing circuitry is operable to report the results of the performed measurements for the plurality of serving cells by reporting measurements for the beams with beam signal qualities better than the beam signal threshold of the measurement object of the measurement configuration with the measurement identifier associated with the triggered event.

12. The wireless device of claim 9, wherein each measurement configuration of the plurality of measurement configurations includes a beam signal threshold, and the processing circuitry is operable to report the results of the performed measurements for the plurality of serving cells by reporting measurements for the beams with beam signal qualities better than the beam signal threshold of a measurement object associated with the serving cell.

13. The wireless device of claim 9, wherein each measurement configuration of the plurality of measurement configurations includes a reference signal type, and the processing circuitry is operable to report the results of the performed measurements for the plurality of serving cells by reporting measurements based on the reference signal type of the report configuration of the measurement configuration with the measurement identifier associated with the triggered event, wherein the reference signal type comprises at least one of a channel state information reference signal (CSI-RS) or a synchronization symbol (SS).

14. The wireless device of claim 9, the processing circuitry further operable to report results of measurements on a neighbor cell to a network node according to a measurement configuration associated with a serving cell that uses the same frequency as the neighbor cell.

15. The wireless device of claim 14, wherein the neighbor cell is one of a plurality of neighbor cells, and based on the performed measurements, the neighbor cell signal quality is higher than the other neighbor cells of the plurality of neighbor cells.

16. A method for measurement configuration and reporting performed by a network node, wherein the method comprises:
    transmitting a plurality of measurement configurations to a wireless device for configuring measurements on a plurality of serving cells, wherein each measurement configuration of the plurality of measurement configurations comprises a measurement identifier, a measurement object, and a report configuration; and
    receiving, from the wireless device, a measurement report that includes results of measurements performed by the wireless device on each serving cell of the plurality of serving cells according to a report configuration of a measurement configuration with a measurement identifier associated with the event that triggered the measurement report,
        wherein each measurement configuration of the plurality of measurement configurations includes a number of beams to report, and the measurement report includes results of measurements performed by the wireless device on each serving cell according to the report configuration of the measurement configuration with the measurement identifier associated with the event that triggered the measurement report.

17. The method of claim 16, wherein each measurement configuration of the plurality of measurement configurations includes an indication of whether beam level measurement is enabled, and the measurement report includes results of measurements performed by the wireless device on each serving cell according to the report configuration of the measurement configuration with the measurement identifier associated with the event that triggered the measurement report.

18. The method of claim 16, wherein each measurement configuration of the plurality of measurement configurations includes a beam signal threshold, and the measurement report includes results of measurements performed by the wireless device on each serving cell for the beams with beam signal qualities better than the beam signal threshold of the measurement object of the measurement configuration with the measurement identifier associated with the event that triggered the measurement report.

19. The method of claim 16, wherein each measurement configuration of the plurality of measurement configurations includes a beam signal threshold, and the measurement report includes results of measurements performed by the wireless device on each serving cell for the beams with beam signal qualities better than the beam signal threshold of a measurement object associated with the serving cell.

20. The method of claim 16, wherein each measurement configuration of the plurality of measurement configurations includes a reference signal type, and the measurement report includes results of measurements performed by the wireless device on each serving cell based on the reference signal type of the report configuration of the measurement configuration with the measurement identifier associated with the event that triggered the measurement report, wherein the reference signal type comprises at least one of a channel state information reference signal (CSI-RS) or a synchronization symbol (SS).

21. The method of claim 16, wherein the measurement report further includes results of measurements on a neighbor cell according to a measurement configuration associated with a serving cell that uses the same frequency as the neighbor cell.

22. The method of claim 21, wherein the neighbor cell is one of a plurality of neighbor cells, and based on the performed measurements, the neighbor cell signal quality is higher than the other neighbor cells of the plurality of neighbor cells.

23. A computer program product comprising a non-transitory computer readable medium storing computer readable program code, the computer readable program code operable, when executed by processing circuitry, to perform the methods of claim 16.

24. A network node comprising processing circuitry operable to:
 transmit a plurality of measurement configurations to a wireless device for configuring measurements on a plurality of serving cells, wherein each measurement configuration of the plurality of measurement configurations comprises a measurement identifier, a measurement object, and a report configuration; and
 receive, from the wireless device, a measurement report that includes results of measurements performed by the wireless device on each serving cell of the plurality of serving cells according to a report configuration of a measurement configuration with a measurement identifier associated with the event that triggered the measurement report,
 wherein each measurement configuration of the plurality of measurement configurations includes a number of beams to report, and the measurement report includes results of measurements performed by the wireless device on each serving cell according to the report configuration of the measurement configuration with the measurement identifier associated with the event that triggered the measurement report.

* * * * *